(12) United States Patent
Zhang et al.

(10) Patent No.: US 10,130,105 B2
(45) Date of Patent: Nov. 20, 2018

(54) BONE-MEAT SEPARATOR

(71) Applicant: Sunby Machinery Co., Ltd., Heilongjiang (CN)

(72) Inventors: Baichun Zhang, Heilongjiang (CN); Tianyang Zhang, Heilongjiang (CN); Tianfang Zhang, Heilongjiang (CN)

(73) Assignee: Sunby Machinery Co., Ltd., Heilongjiang (CN)

(*) Notice: Subject to any disclaimer, the term of this patent is extended or adjusted under 35 U.S.C. 154(b) by 0 days.

(21) Appl. No.: 15/574,512

(22) PCT Filed: Mar. 22, 2017

(86) PCT No.: PCT/CN2017/077672
§ 371 (c)(1),
(2) Date: Nov. 16, 2017

(87) PCT Pub. No.: WO2018/170784
PCT Pub. Date: Sep. 27, 2018

(65) Prior Publication Data
US 2018/0289023 A1    Oct. 11, 2018

(51) Int. Cl.
A22C 17/00    (2006.01)
A22C 21/00    (2006.01)
A22B 5/00    (2006.01)

(52) U.S. Cl.
CPC .......... *A22C 17/004* (2013.01); *A22B 5/0035* (2013.01); *A22C 21/0069* (2013.01)

(58) Field of Classification Search
CPC ...... A22C 17/00; A22C 17/002; A22C 17/026
(Continued)

(56) References Cited

U.S. PATENT DOCUMENTS

RE32,060 E  *  12/1985  McFarland ............ A22C 17/04
                                                      426/479
5,041,055 A      8/1991   Roth
                (Continued)

FOREIGN PATENT DOCUMENTS

CN      203563623 U    4/2014
DE       149154 A5    7/1981
(Continued)

OTHER PUBLICATIONS

International Searching Authority, Search Report issued in International Application No. PCT/CN2017/077672 dated Mar. 22, 2017, 5 pages.

*Primary Examiner* — Richard T Price, Jr.
(74) *Attorney, Agent, or Firm* — Wood Herron & Evans LLP

(57) ABSTRACT

A bone-meat separator includes a chassis, a driving mechanism, a transmission shaft, a spiral shaft, a feed hopper, a pressurization portion and a bone-meat separation portion. In this design, a separation spiral shaft portion is a conical spiral shaft; the bone-meat separation portion is a conical component coaxially sheathed on the periphery of the separation spiral shaft portion, and an inner wall of the bone-meat separation portion is in clearance fit with an outer wall of the separation spiral shaft portion. With regard to the bone-meat separator, since the inner wall of the bone-meat separation portion and the outer wall of the spiral shaft are always in a stable clearance fit state, the service life is improved.

10 Claims, 10 Drawing Sheets

(58) Field of Classification Search
USPC .......................................... 452/135, 138, 139
See application file for complete search history.

(56) References Cited

U.S. PATENT DOCUMENTS

| | | | | |
|---|---|---|---|---|
| 5,160,290 | A | * | 11/1992 | Richburg ............... A22C 17/04 |
| | | | | 241/24.16 |
| 5,580,305 | A | * | 12/1996 | McFarland ............ A22C 17/04 |
| | | | | 241/74 |
| 5,597,352 | A | | 1/1997 | Roth |
| 5,733,184 | A | * | 3/1998 | Curry ..................... A22C 17/04 |
| | | | | 452/111 |
| 5,749,776 | A | * | 5/1998 | Evans ..................... A22C 17/04 |
| | | | | 452/138 |
| 7,771,256 | B1 | * | 8/2010 | Richburg ............... A22C 17/04 |
| | | | | 241/74 |

FOREIGN PATENT DOCUMENTS

| | | | |
|---|---|---|---|
| EP | 0030131 | A1 | 6/1981 |
| WO | 8401267 | A1 | 4/1984 |

* cited by examiner

BONE-MEAT SEPARATOR

CROSS-REFERENCE TO RELATED APPLICATIONS

This application is a national phase of PCT/CN2017/077672, filed on Mar. 22, 2017, titled "BONE-MEAT SEPARATOR", the entire content of which is incorporated herein by reference.

TECHNICAL FIELD

The present invention relates to foodstuff processing machines and, in particular, to a bone-meat separator.

BACKGROUND

At present, the raw materials to be separated by bone-meat separators are mainly poultry's necks and deboned skeletons. After meat is preliminarily collected from these raw materials, there will also be a large amount of meat on these raw materials. Since the manual collection is inconvenient, low in efficiency and high in cost, in order to collect meat on these low-cost raw materials, bone-meat separators are produced. The bone-meat separators separate bone from meat by crushing and extruding, so both time and labor are saved and higher economic benefits can be thus obtained. However, since separation portions of the existing bone-meat separators are easily worn, the bone-meat separation effect becomes poor and better and stable bone-meat separation effect cannot be maintained. Moreover, since the separation portion is heavy, it is inconvenient to replace the separation portion and the service life of the bone-meat separator is thus decreased.

SUMMARY

An objective of the present invention is to provide a bone-meat separator in order to solve the problems in the prior art, so that better bone-meat separation effect can be realized and the service life of the bone-meat separator can be increased.

For this purpose, the present invention provides the following solutions.

A bone-meat separator is provided, including a chassis, a driving mechanism, a transmission shaft, a spiral shaft, a feed hopper, a pressurization portion and a bone-meat separation portion, wherein the feed hopper is arranged on the chassis; an outlet of the feed hopper is communicated with an inlet of the pressurization portion, and an outlet of the pressurization portion is communicated with an inlet of the bone-meat separation portion; one end of the transmission shaft is connected to an output end of the driving mechanism, and one end of the spiral shaft is sheathed on the other end of the transmission shaft and is movable relative to the transmission shaft; the spiral shaft includes a feeding spiral shaft portion located below the feed hopper, a pressurization spiral shaft portion located within the pressurization portion and a separation spiral shaft portion located within the bone-meat separation portion; the separation spiral shaft portion is a conical spiral shaft; the bone-meat separation portion is a conical component coaxially sheathed on the periphery of the separation spiral shaft portion, and an inner wall of the bone-meat separation portion is in clearance fit with an outer wall of the separation spiral shaft portion; larger ends of both the separation spiral shaft portion and the bone-meat separation portion are ends close to the pressurization portion; meat discharge gaps are provided on a side wall of the end of the bone-meat separation portion close to the pressurization portion; a control valve is provided inside the bone-meat separation portion and sheathed on the periphery of a front end of the separation spiral shaft portion, and a residue discharge gap is provided between the control valve and the front end of the separation spiral shaft portion; a residue outlet is provided on a side wall of the bone-meat separation portion in front of the control valve; the spiral shaft is a hollow spiral shaft within which an adjustment lever is provided; a connector is internally fixed at one end of the spiral shaft connected to the transmission shaft; and, one end of the adjustment lever is in threaded connection to the connector, while the other end thereof extends out from the spiral shaft and then into the bone-meat separation portion.

Preferably, an adjustment lever locknut is provided at one end of the adjustment lever extending out from the spiral shaft, an annular groove is provided on an outer wall of the adjustment lever locknut, and a nylon sleeve annularly sheathed on the periphery of the adjustment lever is sheathed in a middle portion of the spiral shaft.

Preferably, the separation spiral shaft portion includes a first shaft, a second shaft, a conical sleeve and a separation spiral; the second shaft is connected to the pressurization spiral shaft portion, the separation spiral is arranged on the periphery of the second shaft, and the second shaft is in key connection to the separation spiral; all the first shaft, the second shaft, the pressurization spiral shaft portion and the feeding spiral shaft portion are formed integrally; the separation spiral is conical, and the larger end of the separation spiral is an end close to the pressurization spiral shaft portion; and elongated bumps each having a semicircular cross-section are axially provided on an outer surface of a spiral groove of the separation spiral between blades;

the conical sleeve is arranged on a side close to a smaller end of the separation spiral, located on the periphery of the second shaft and in key connection to the second shaft, and the conical sleeve is locked by conical sleeve locknuts;

the control valve is arranged on the periphery of the conical sleeve, and an inner conical surface fitted with the conical sleeve is provided on an inner wall of the control valve, the residue discharge gap is provided between the outer wall of the conical sleeve and the inner conical surface of the control valve, several residue guide grooves are uniformly distributed on a side wall of the conical sleeve in a circumferential direction of the conical sleeve, and a lengthwise direction of each of the residue guide grooves is in an axial direction of the conical sleeve; and the first shaft is a conical shaft, and the larger end of the first shaft is an end connected to the second shaft.

Preferably, the pressurization portion includes a high pressure chamber, a spiral rifling is provided on an inner wall of the high pressure chamber, and the high pressure chamber is arranged on the chassis and communicated with the outlet of the feed hopper; and the bone-meat separation portion includes a filter cylinder frame and a separation cylinder; the separation cylinder is a conical cylinder coaxial with the spiral shaft, and the larger end of the separation cylinder is an end close to the high pressure chamber; the filter cylinder frame is a conical cylinder coaxial with the spiral shaft, meat outlets are provided on the filter cylinder frame, and the larger end of the filter cylinder frame is connected to an end face of the outlet of the high pressure chamber; the separation cylinder is nested in the filter cylinder frame; the separation cylinder is sheathed on the periphery of the separation spiral shaft portion and in clearance fit with the separation spiral shaft portion; a plurality of meat discharge gaps are provided on the separation cylinder, and the meat discharge gaps are arranged in a lengthwise direction along the axial direction of the separation cylinder and extend from the larger end to the smaller end of the separation cylinder; and, annular reinforcing ribs are provided on the outer wall of the separation cylinder.

Preferably, the depth direction of the meat discharge gaps is inclined and offset from a radial direction of the separation cylinder, and the direction of inclination is the same as a rotation direction of the spiral shaft; and, the width of the meat discharge gaps gradually becomes larger from the inner wall to the outer wall of the separation cylinder.

Preferably, the bone-meat separation portion further includes a flange, a control valve braking block, a front frame, a front gland and a sliding sleeve; the flange is clamped with the filter cylinder frame through a clamping disc; the front frame is a hollow frame, a residue outlet is provided on the bottom of the front frame, and one end of the front frame is connected to the flange while the other end is connected to the front gland; and the sliding sleeve is arranged inside a bearing within the front frame and the front gland, the first shaft is in key connection to the sliding sleeve, and a number of grooves are provided on an outer wall of the sliding sleeve; an outer wall of one end of the control valve is in threaded connection to an inner wall of the flange, while gear teeth are provided on an outer wall of the other end of the control valve; the control valve is engaged with a gear shaft through the gear teeth; a ratchet wrench is provided on the gear shaft; the gear shaft is mounted on the front frame and is rotatable on the front frame; the rotation of the ratchet wrench can drive the rotation of the gear shaft so that the control valve is allowed to rotate relative to the flange to generate a displacement; and, the control valve braking block is mounted on the front frame through a pin shaft, and the control valve braking block can be jammed on the gear teeth of the control valve exposed out from the front frame.

Preferably, the bone-meat separation portion further includes a shield with an opening formed on the bottom thereof; the shield is mounted on the control valve through a compression ring; a pointer is fixedly mounted on the shield, a pointer opening having a width matched with the width of the pointer is formed on the front frame in the axial direction, and the pointer extends into and out from the pointer opening; and, a scale is provided on a side wall of the periphery of the front frame where the pointer opening is formed.

Preferably, the bone-meat separator further includes an swing-type lifter frame; the swing-type lifter frame includes a lifter mount, a front swing arm, a rear swing arm and a lifter support; the lifter mount is arranged on the outer wall of the top of the front frame; the lifter support is arranged on the outer wall of the high pressure chamber; a sliding shaft passes through the lifter mount, a lifter shield is connected to the sliding shaft, and a lower end of the lifter shield is sheathed on the sliding shaft; one end of the front swing arm is connected to the lifter shield through a lifter adjusting bolt; a lifter adjusting nut is provided outside the lifter adjusting bolt above the front swing arm, and a lifter protection cover is provided on the top of the lifter adjusting bolt; the lifter adjusting bolt can move up and down by rotating the lifter adjusting nut; the other end of the front swing arm is connected to one end of the rear swing arm through a middle spindle, while the other end of the rear swing arm is connected to the lifter support through a rear spindle; and, a lifter limiting pin is provided on the lifter support.

Preferably, a partition ring is provided inside the filter cylinder frame; an inner wall of the partition ring comes into contact with the outer wall of the separation cylinder to partition the filter cylinder frame into a first frame and a second frame; meat outlets are provided on both the first frame and the second frame; a first isolation hood is sheathed outside the first frame, and/or a second isolation hood is sheathed outside the second frame; a pipe port is provided on the first insulation hood and/or the second isolation hood; fixed plates each having an opening formed on its bottom are provided on the first insulation hood and/or the second isolation hood, and the first insulation hood and/or the second isolation hood is fastened on the filter cylinder frame through a fastening component; the fastening component includes a fastening mount, a fastening connecting plate and a fastening locking screw; the fastening mount is arranged on the high pressure chamber; two ends of the fastening connecting plate are connected to the fastening mount and the clamping disc through pin shafts, respectively; one end of the fastening locking screw is connected to the fastening mount through a pin shaft; a first fastening locknut and/or a second fastening locknut is provided on the fastening locking screw; and, the locking screw passes through the fixed plates and is then locked by the first fastening locknut and/or the second fastening locknut.

Preferably, the feed hopper is located above the spiral shaft and provided with a first spiral crushing shaft and a second spiral crushing shaft which rotate together in opposite directions, and several guide strips are provided between the bottom of the feed hopper and the spiral shaft; and the driving mechanism includes a motor, a belt, a first pulley, a second pulley and a speed reducer; an output shaft of the motor is connected to the first pulley; the first pulley is connected to the second pulley through the belt, and the second pulley is connected to an input shaft of the speed reducer; an output shaft of the speed reducer is connected to the transmission shaft through a coupler; a first chain wheel is provided on the coupler; a second chain wheel and a first gear are provided on the first spiral crushing shaft; the first chain wheel is connected to the second chain wheel through a chain; a second gear is provided on the second spiral crushing shaft; the first gear is engaged with the second gear; the transmission shaft is arranged on a bearing seat; and, a sewage outlet is provided on an end face of an end of the bearing seat close to the feed hopper.

Compared with the prior art, the present invention has the following technical effects.

In the present invention, since the separation spiral shaft portion is a conical spiral shaft and the bone-meat separation portion is designed as a conical component coaxially sheathed on the periphery of the separation spiral shaft portion, after the spiral shaft is worn, the gap between the spiral shaft and the bone-meat separation portion may be adjusted by adjusting the axial displacement of the spiral shaft, so that the inner wall of the bone-meat separation portion and the outer wall of the spiral shaft are always in a stable clearance fit state. Accordingly, the bone-meat separator can always maintain better bone-meat separation effect and have higher meat-bone separation efficiency, and the service life of the bone-meat separator is increased.

Meanwhile, on one hand, the hollow spiral shaft can reduce the weight of the spiral shaft and is easy to hold; and on the other hand, since spiral blades are wound around the outer circumference of the spiral shaft and the shaft is easily bent and deformed after welding, the hollow spiral shaft can increase the rigidity of the shaft and relieve the bending.

During the adjustment of the axial displacement of the spiral shaft, since the tail end of the adjustment lever is in threaded connection to the connector, a relative displacement is generated between the adjustment lever and the connector by rotating the adjustment lever, so that the tail end of the adjustment lever contacts the front end of the transmission shaft. By further rotating the adjustment lever, the adjustment lever resists against the transmission shaft, so that a relative replacement is generated between the connector and the adjustment lever and the connector thus drives the spiral shaft to move relative to the transmission shaft. As a result, the axial displacement of the spiral shaft is adjusted. Accordingly, the gap between the outer wall of the spiral shaft and the inner wall of the bone-meat separation portion may be maintained, better bone-meat separation effect is realized, and the service life of the bone-meat separator is also increased.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

REFERENCE LIST

Figure 1:
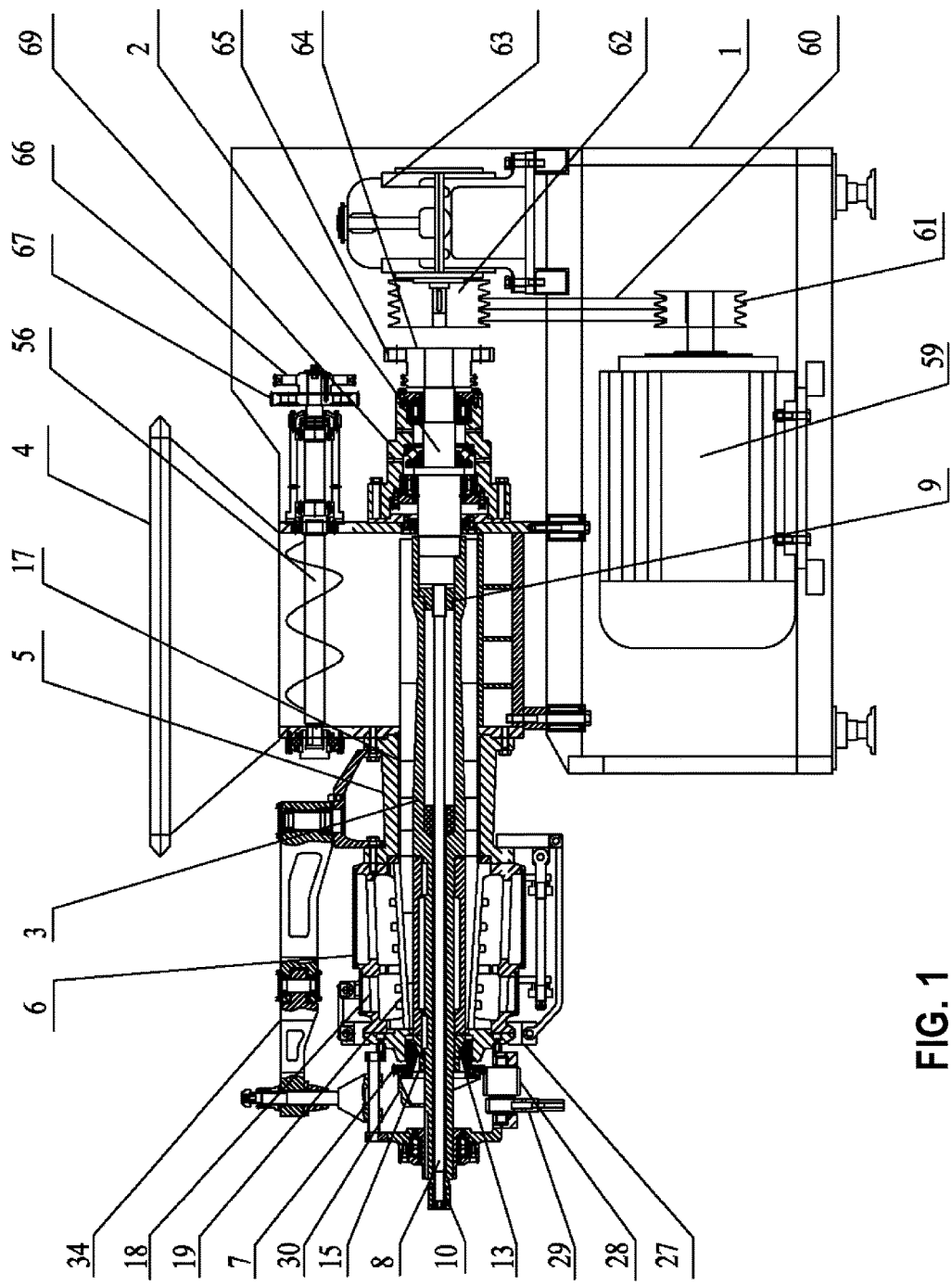
FIG. 1 is a schematic diagram of the overall structure of a bone-meat separator according to one embodiment of the present invention.

1: chassis
2: transmission shaft
3: spiral shaft
4: feed hopper
5: pressurization portion
6: bone-meat separation portion
7: control valve
8: adjustment lever
9: connector
10: adjustment lever locknut
11: first shaft
12: second shaft
13: conical sleeve
14: separation spiral
15: conical sleeve locknut
16: residue guide groove
17: high pressure chamber
18: filter cylinder frame
19: separation cylinder
20: annular reinforcing rib
21: meat discharge gap
22: flange
23: control valve braking block
24: front frame
25: front gland
26: sliding sleeve
27: clamping disc
28: gear shaft
29: ratchet wrench
30: shield
31: compression ring
32: pointer
33: pointer opening
34: swing-type lifter frame
35: lifter mount
36: front swing arm
37: rear swing arm
38: lifter support
39: lifter adjusting bolt
40: lifter adjusting nut
41: middle spindle
42: rear spindle
43: lifter limiting pin
44: partition ring
45: first frame
46: second frame
47: first isolation hood
48: second isolation hood
49: pipe port
50: fixed plate
51: fastening mount
52: fastening connecting plate
53: fastening locking screw 54: first fastening locknut
55: second fastening locknut
56: first spiral crushing shaft
57: second spiral crushing shaft
58: guide strip
59: motor
60: belt
61: first pulley
62: second pulley
63: speed reducer
64: coupler
65: first chain wheel
66: second chain wheel
67: first gear
68: lifter protection cover
69: bearing seat
70: sewage outlet
71: nylon sleeve
72: elongated bump
73: sliding sleeve
74: lifter shield

DETAILED DESCRIPTION

The technical solutions in the embodiments of the present invention will be clearly and completely described below with reference to the accompanying drawings in the embodiments of the present invention. Apparently, the embodiments described herein are merely a part but not all the embodiments of the present invention. All other embodiments obtained by a person of ordinary skill in the art without any creative effort on the basis of the embodiments in the present invention shall fall into the protection scope of the present invention.

An objective of the present invention is to provide a bone-meat separator in order to solve the problems in the prior art, so that better bone-meat separation effect can be realized and the service life of the bone-meat separator can be increased.

To make the objectives, features and advantages of the present invention more obvious and comprehensible, the present invention will be further described below in detail by specific implementations with reference to the accompanying drawings.

Figure 2:
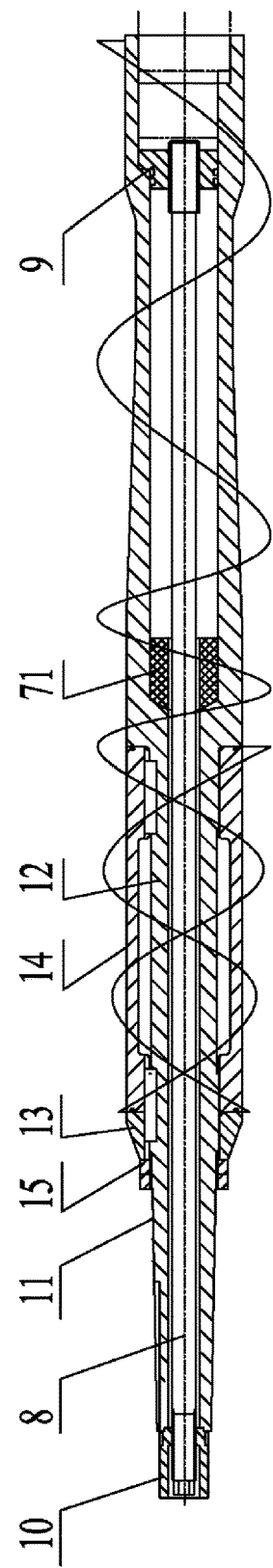
FIG. 2 is a schematic structure diagram of a spiral shaft of the bone-meat separator of FIG. 1.
Figure 5:
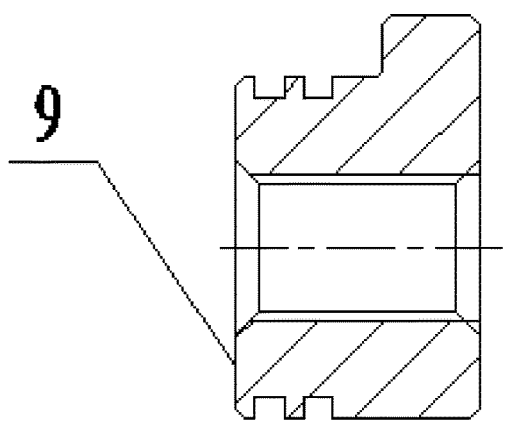
FIG. 5 is a front view of a connector of the bone-meat separator of FIG. 1.
Figure 6:
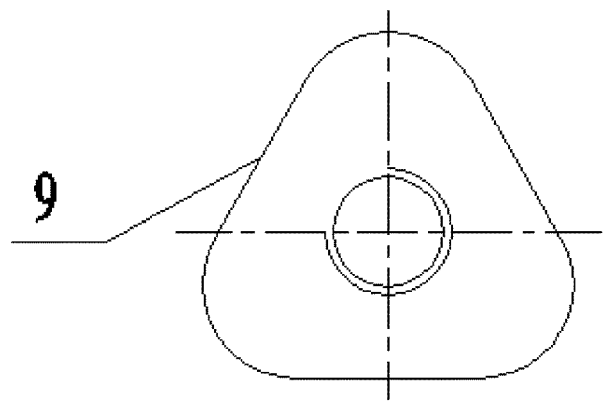
FIG. 6 is a right view of the connector of FIG. 5.

This embodiment provides a bone-meat separator, as shown in FIG. 1, including a chassis 1, a driving mechanism, a transmission shaft 2, a spiral shaft 3, a feed hopper 4, a pressurization portion 5 and a bone-meat separation portion 6. The feed hopper 4 is arranged on the chassis 1, an outlet of the feed hopper 4 is communicated with an inlet of the pressurization portion 5, and an outlet of the pressurization portion 5 is communicated with an inlet of the bone-meat separation portion 6. One end of the transmission shaft 2 is connected to an output end of the driving mechanism, and one end of the spiral shaft 3 is sheathed on the other end of the transmission shaft 2 and is movable relative to the transmission shaft 2. In this embodiment, an internal triangular hole is provided at one end of the spiral shaft 3, and an external triangular hole matched with the internal triangular hole is provided at one end of the transmission shaft 2 connected to the spiral shaft 3. The spiral shaft 3 includes a feeding spiral shaft portion located below the feed hopper 4, a pressurization spiral shaft portion located within the pressurization portion 5 and a separation spiral shaft portion located within the bone-meat separation portion 6. The separation spiral shaft portion is a conical spiral shaft. The bone-meat separation portion 6 is a conical component coaxially sheathed on the periphery of the separation spiral shaft portion, and an inner wall of the bone-meat separation portion 6 is in clearance fit with an outer wall of the separation spiral shaft portion. Larger ends of both the separation spiral shaft portion and the bone-meat separation portion 6 are ends close to the pressurization portion 5. Meat discharge gaps are provided on a side wall of the end of the bone-meat separation portion 6 close to the pressurization portion 5. A control valve 7 is provided inside the bone-meat separation portion 6 and sheathed on the periphery of a front end of the separation spiral shaft portion, and a residue discharge gap is provided between the control valve 7 and the front end of the separation spiral shaft portion. A residue outlet is provided on a side wall of the bone-meat separation portion 6 in front of the control valve 7. As shown in FIG. 2, the spiral shaft 3 is a hollow spiral shaft within which an adjustment lever 8 is provided. A connector 9 as shown in FIGS. 5 and 6 is internally fixed at one end of the spiral shaft 3 connected to the transmission shaft 2. One end of the adjustment lever 8 is in threaded connection to the connector 9, while the other end thereof extends out from the spiral shaft 3 and then into the bone-meat separation portion 6.

When in use of the bone-meat separator of the present invention, a material to be separated is fed from the feed hopper 4. After the material is fed into the feed hopper 4, the spiral shaft 3 conveys and crushes the material. After the material is conveyed to the pressurization portion 5, due to the reduced space for the movement of the material and the squeezing action of the material during the conveying, the pressure in the pressurization portion 5 becomes larger, and the material is crushed into meat cubes and bone dregs within the pressurization portion 5. The crushed material is continuously conveyed to the bone-meat separation portion 6 and then further crushed. Since the size of the bone dregs is larger than the size of the meat cubes, the material will be filtered and separated in the bone-meat separation portion 6, so that the meat cubes of a smaller size are filtered out from the bone-meat separation portion 6 and then discharged from the meat discharge gaps, and the bone dregs in the bone-meat separation portion 6 are conveyed from the spiral shaft 3 to the front end of the separation spiral shaft portion and then discharged from the residue discharge gap between the front end of the separation spiral shaft portion and the control valve 7. During the bone-meat separation process, the spiral shaft 3 will generate collision and friction with the material, and the spiral shaft 3 will also generate friction with the inner wall of the bone-meat separation portion 6. After the long-term operation, the blades of the spiral shaft 3 will be worn, and the gap between the spiral shaft 3 and the bone-meat separation portion 6 will thus become larger. Therefore, the worn part of the blades of the spiral shaft 3 needs to be repaired regularly, and the bone-meat separation effect will be influenced if the spiral shaft 3 is not replaced. However, it is difficult and costly to replace the spiral shaft, and the service life of the spiral shaft 3 is reduced.

In the present invention, since the separation spiral shaft portion is a conical spiral shaft and the bone-meat separation portion 6 is designed as a conical component coaxially sheathed on the periphery of the separation spiral shaft portion, after the spiral shaft 3 is worn, the gap between the spiral shaft 3 and the bone-meat separation portion 6 may be adjusted by adjusting the axial displacement of the spiral shaft 3, so that the inner wall of the bone-meat separation portion 6 and the outer wall of the spiral shaft 3 are always in a stable clearance fit state. Accordingly, the bone-meat separator can always maintain better bone-meat separation effect and have higher meat-bone separation efficiency, and the service life of the bone-meat separator is increased.

Meanwhile, on one hand, the hollow spiral shaft 3 can reduce the weight of the spiral shaft and is easy to hold; and on the other hand, since spiral blades are wound around the outer circumference of the spiral shaft 3 and the shaft is easily bent and deformed after welding, the hollow spiral shaft can increase the rigidity of the shaft and relieve the bending.

During the adjustment of the axial displacement of the spiral shaft 3, since the tail end of the adjustment lever 8 is in threaded connection to the connector 9, a relative displacement is generated between the adjustment lever 8 and the connector 9 by rotating the adjustment lever 8, so that the tail end of the adjustment lever 8 contacts the front end of the transmission shaft 2. By further rotating the adjustment lever 8, the adjustment lever 8 resists against the transmission shaft 2, so that a relative replacement is generated between the connector 9 and the adjustment lever 8 and the connector 9 thus drives the spiral shaft 3 to move relative to the transmission shaft 2. In this way, the axial displacement of the spiral shaft 3 is adjusted. Accordingly, the gap between the outer wall of the spiral shaft 3 and the inner wall of the bone-meat separation portion 6 may be maintained, better bone-meat separation effect is realized, and the service life of the bone-meat separator is also increased.

In this embodiment, an adjustment lever locknut 10 is provided at one end of the adjustment lever 8 extending out from the spiral shaft 3; an annular groove is provided on an outer wall of the adjustment lever locknut 10; a nylon sleeve 71 annularly sheathed on the periphery of the adjustment lever is sheathed in a middle portion of the spiral shaft; and, an inner wall of the nylon sleeve 71 is in clearance fit with an outer wall of the adjustment lever 8 in order to support the adjustment lever 8 and prevent the shaking of the adjustment lever 8.

During the adjustment of the axial displacement of the spiral shaft 3, the adjustment lever locknut 10 is unscrewed first, and the adjustment lever 8 is rotated. After the axial displacement of the adjustment lever 8 is adjusted, the position of the spiral shaft 3 may be locked by screwing the adjustment lever locknut 10, and the gap between the outer wall of the spiral shaft 3 and the inner wall of the bone-meat separation portion 6 is thus locked. By providing an annular groove on the outer wall of the adjustment lever locknut 10, the friction when screwing the adjustment lever locknut 10 is increased.

Figure 7:
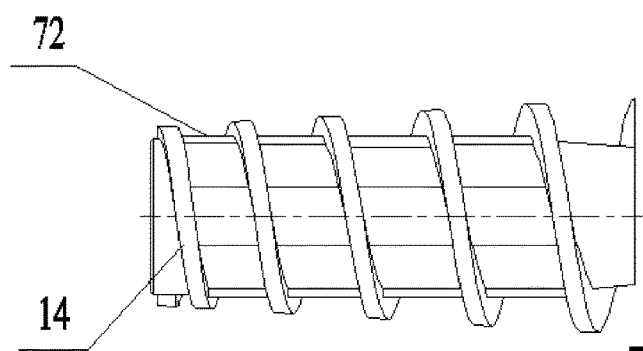
FIG. 7 is a schematic structure diagram of a separation spiral of the bone-meat separator of FIG. 1.

As shown in FIG. 2, the separation spiral shaft portion includes a first shaft 11, a second shaft 12, a conical sleeve 13 and a separation spiral 14. The second shaft 12 is connected to the pressurization spiral shaft portion, the separation spiral 14 is arranged on the periphery of the second shaft 12, and the second shaft 12 is in key connection to the separation spiral 14. All the first shaft 11, the second shaft 12, the pressurization spiral shaft portion and the feeding spiral shaft portion are formed integrally. The separation spiral 14 is conical, and the larger end of the separation spiral 14 is an end close to the pressurization spiral shaft portion. As shown in FIG. 7, elongated bumps 72 each having a semicircular cross-section are axially and uniformly distributed on an outer surface of a spiral groove of the separation spiral between blades. These elongated bumps 72 can increase the flowability of the material during the rotation, and the separation rate is thus improved.

The conical sleeve 13 is arranged on a side close to a smaller end of the separation spiral 14, located on the periphery of the second shaft 12 and in key connection to the second shaft 12, and the conical sleeve 13 is locked by conical sleeve locknuts 15.

Figure 3:
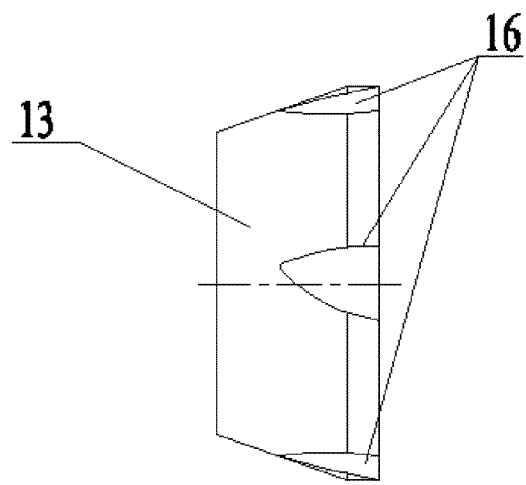
FIG. 3 is a front view of a conical sleeve of the bone-meat separator of FIG. 1.
Figure 4:
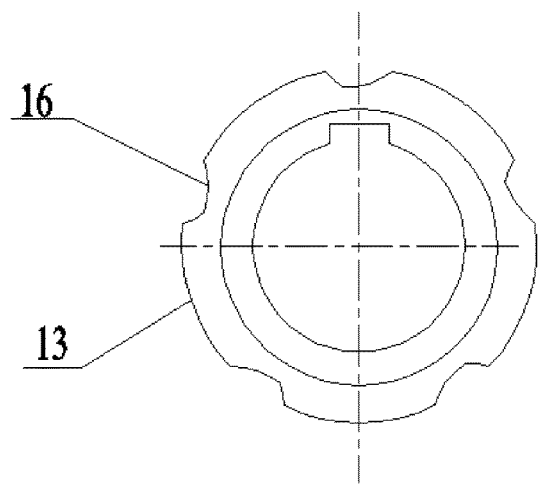
FIG. 4 is a right view of the conical sleeve of FIG. 3.

The control valve 7 is arranged on the periphery of the conical sleeve 13, and an inner conical surface fitted with the conical sleeve 13 is provided on an inner wall of the control valve 7. The residue discharge gap is provided between the outer wall of the conical sleeve 13 and the inner conical surface of the control valve 7. As shown in FIGS. 3 and 4, several residue guide grooves 16 are uniformly distributed on a side wall of the conical sleeve 13 in a circumferential direction of the conical sleeve.

The first shaft 11 is a conical shaft, and the larger end of the first shaft 11 is an end connected to the second shaft 12.

As a conveying and crushing shaft, the spiral shaft 3 of the bone-meat separator is an easily-worn component, particularly the separation spiral shaft portion, which needs to be repaired after long-term use. Moreover, due to its heavy weight, it is convenient to assemble or disassemble the spiral shaft 3. With regard to the separation spiral shaft portion of the present invention, since the separation shaft is sheathed outside the second shaft 12, the separation spiral 14 may be separately disassembled and replaced after it has been worn, and it is unnecessary to replace the whole spiral shaft 3. In the separated form, it is convenient for replacement and maintenance, the working efficiency is improved, and it is convenient to use.

Since all the first shaft 11, the second shaft 12, the pressurization spiral shaft portion and the feeding spiral shaft portion are formed integrally, the rigidity of the spiral shaft 3 may be ensured in the integral shaft form and the spiral shaft 3 is less likely to bend and deform.

Since the bone dregs are discharged from the residue discharge gap between the conical sleeve 13 at the smaller end of the spiral shaft 3 and the control valve 7, the conical sleeve 13 is also an easily-worn component. By separating the conical sleeve from the spiral shaft 3 and locking the conical sleeve by two conical sleeve locknuts 15, it is convenient to replace the conical sleeve.

Several residue guide grooves 16 are uniformly distributed on a side wall of the conical sleeve 13 in a circumferential direction of the conical sleeve, and a lengthwise direction of each of the residue guide grooves 16 is in an axial direction of the conical sleeve 13. As shown in FIGS. 3 and 4, in this embodiment, the residue guide grooves 16 are preferably designed as grooves having a certain angle of inclination and a leftward direction of rotation. When the bone-meat separator operates, the residue discharge gap between the conical sleeve 13 and the control valve 7 is used for discharging bone dregs. However, the bone dregs are different in size, and large bone dregs cannot be discharged from a small gap. This deficiency may be overcome by the residue guide grooves 16. The residue guide grooves 16 having an angle of inclination and a leftward direction of rotation will facilitate the smooth discharge of the bone dregs and will not hinder the bone dregs. Since the whole conical sleeve 13 is hardened to enhance the hardness and wear performance of its material, the service life is increased.

The pressurization portion 5 includes a high-pressure chamber 17, a spiral rifling is provided on an inner wall of the high-pressure chamber 17, and the high-pressure chamber 17 is arranged on the chassis 1 and communicated with the outlet of the feed hopper 4.

Figure 10:
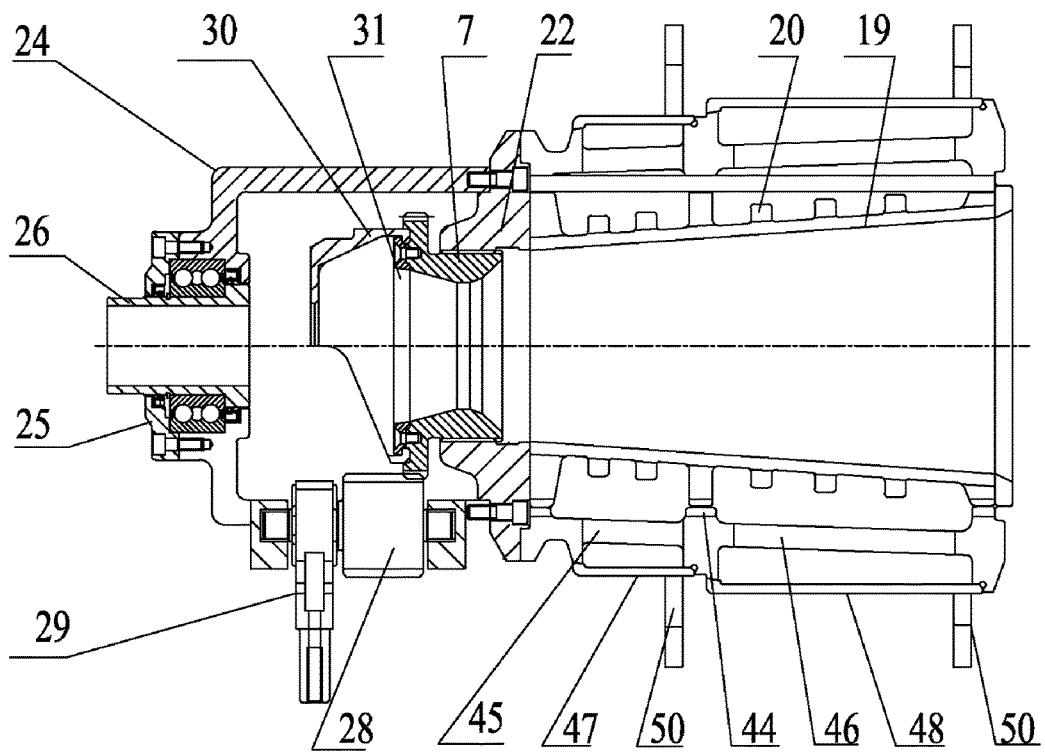
FIG. 10 is a schematic structure diagram of a bone-meat separation portion of the bone-meat separator of FIG. 1.
Figure 14:
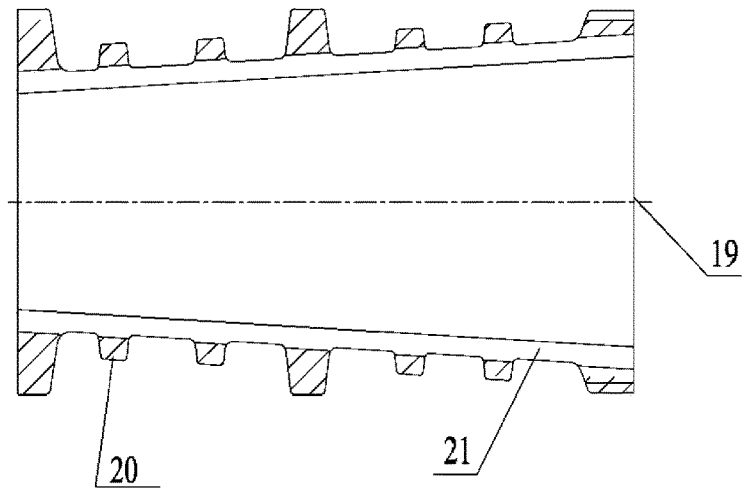
FIG. 14 is a front view of a separation cylinder of the bone-meat separator of FIG. 1.

As shown in FIGS. 1, 10 and 14, the bone-meat separation portion 6 includes a filter cylinder frame 18 and a separation cylinder 19. The separation cylinder 19 is a conical cylinder coaxial with the spiral shaft 3, and the larger end of the separation cylinder 19 is an end close to the high-pressure chamber 17. The filter cylinder frame 18 is a conical cylinder coaxial with the spiral shaft 3, meat outlets are provided on the filter cylinder frame 18, and the larger end of the filter cylinder frame 18 is connected to an end face of the outlet of the high-pressure chamber 17. The separation cylinder 19 is nested in the filter cylinder frame 18. The separation cylinder 19 is sheathed on the periphery of the separation spiral shaft portion and in clearance fit with the separation spiral shaft portion. A plurality of meat discharge gaps is provided on the separation cylinder 19, and the meat discharge gaps are arranged in a lengthwise direction along the axial direction of the separation cylinder 19 and extend from the larger end to the smaller end of the separation cylinder 19. Annular reinforcing ribs 20 are provided on the outer wall of the separation cylinder 19.

In this embodiment, two positioning guide strips are provided on an inner wall of the filter cylinder frame 18, and positioning guide grooves matched with the positioning guide strips are formed at corresponding positions on an outer wall of the separation cylinder 19. The separation cylinder 19 is sheathed on the filter cylinder frame 18 through the positioning guide strips and the positioning guide grooves, so that a rail-type structure is formed. When the separation cylinder 19 is mounted, the positioning effect may be realized, and the inconvenience of assembly and disassembly for workers may be improved.

Since a spiral rifling is provided inside the high-pressure chamber 17, the resistance suffered by the material when moving within the high-pressure chamber 17 is increased, the pressure within the high-pressure chamber 17 is increased, and the crushing efficiency of the material is thus improved.

By designing the separation cylinder 19 to be conical, the service life may be prolonged by adjusting the axial displacement of the spiral shaft 3; moreover, the pressure within the separation cylinder 19 may be increased, so that the pressure applied to the raw material during its movement from the larger end to the smaller end of the separation cylinder 19 is increased, the crushing effect can be enhanced, and it is advantageous to discharge the meat cubes from the separation cylinder 19. In this embodiment, annular reinforcing ribs 20 are provided on the outer wall of the separation cylinder 19. The annular reinforcing ribs 20 may ensure that the separation cylinder 19 still has a very high strength even after many gaps are formed by cutting, and that the separation cylinder 19 will not be damaged due to the internal pressure expansion.

Figure 15:
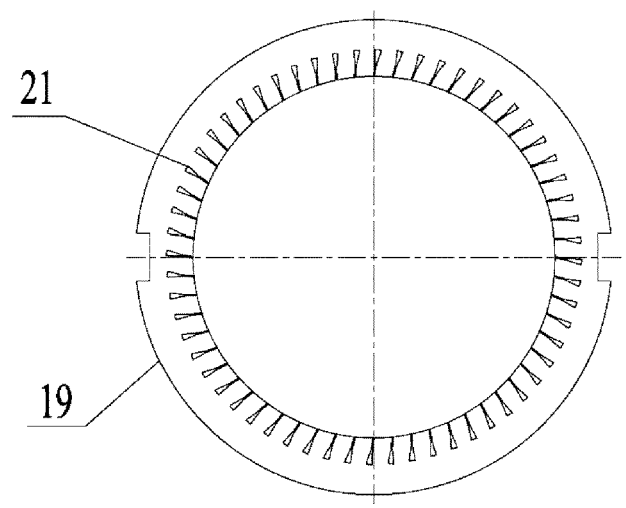
FIG. 15 is a right view of the separation cylinder of FIG. 14.
Figure 16:
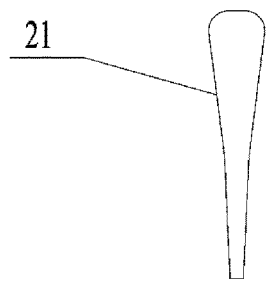
FIG. 16 is a schematic structure diagram of meat discharge gaps on the separation cylinder of FIG. 14.

As shown in FIGS. 15 and 16, the depth direction of the meat discharge gaps 21 is inclined and offset from a radial direction of the separation cylinder 19, and the direction of inclination is the same as a rotation direction of the spiral shaft 3; and, the width of the meat discharge gaps 21 gradually becomes larger from the inner wall to the outer wall of the separation cylinder 19. Since the meat cubes are smaller in size than the bone dregs, the meat cubes are discharged from the meat discharge gaps 21, and the bone dregs stay in the separation cylinder 19. Since the meat discharge gaps 21 having an angle of inclination on the separation cylinder 19 are straight gaps arranged in the radial direction of the separation cylinder, the separation is smoother and the yield is increased.

As a preferred implementation of the meat discharge gaps 21 of the present invention, and as shown in FIG. 16, in the depth direction of the meat discharge gaps 21, the width of the meat discharge gaps 21 gradually becomes larger from the inner wall to the outer wall of the separation cylinder 19; and, for each of the meat discharge gaps 21, the width of the bottom is 0.3 mm to 0.35 mm, the width of the middle portion is 0.8 mm to 0.85 mm, and the width of the top is 2.5 mm. In such a design, since the width of the bottoms of the gaps is smaller, it is ensured that the bone dregs will not enter the smaller bottoms of the gaps and not be discharged from the meat discharge gaps 21; moreover, since the width of the tops of the gaps is larger, the permeability is good, and it is convenient to discharge the meat cubes. Meanwhile, since a larger space is provided for the meat cubes after the meat cubes arrive at the tops of the gaps, the meat cubes can be quickly discharged.

Figure 8:
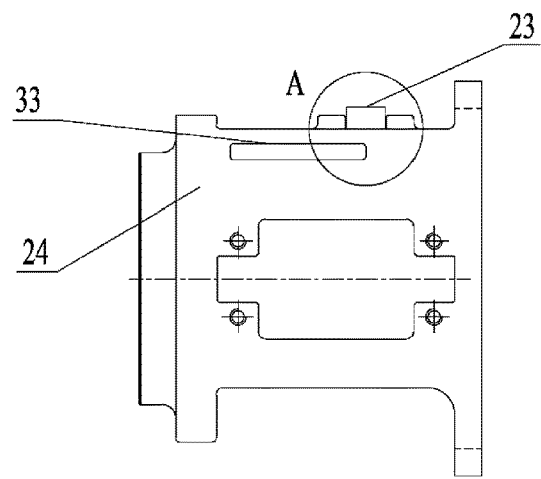
FIG. 8 is a schematic structure diagram of a front frame of the bone-meat separator of FIG. 1.
Figure 9:
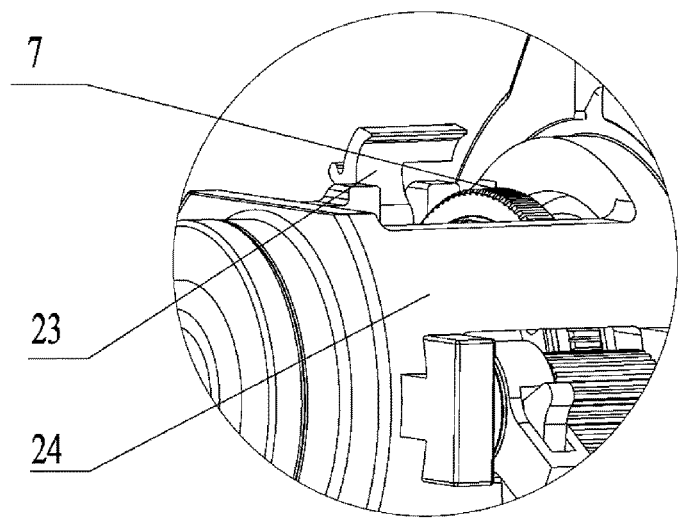
FIG. 9 is a partially enlarged structure diagram of detail A shown in FIG. 8.
Figure 12:
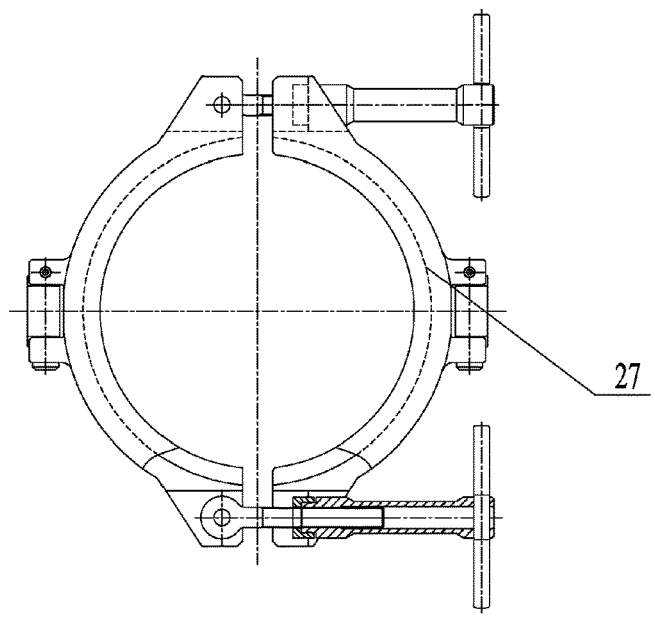
FIG. 12 is a schematic structure diagram of a clamping disc of the bone-meat separator of FIG. 1.
Figure 17:
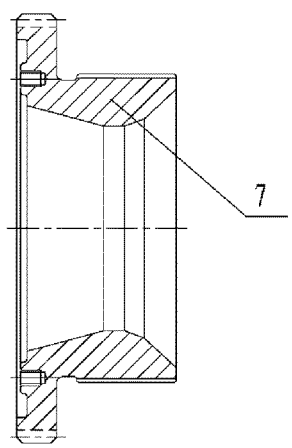
FIG. 17 is a schematic structure diagram of a control valve of the bone-meat separator of FIG. 1.

As shown in FIGS. 1, 8, 9 and 10, the bone-meat separation portion 6 further includes a flange 22, a control valve braking block 23, a front frame 24, a front gland 25 and a sliding sleeve 26. The flange 22 is clamped with the filter cylinder frame 18 through a clamping disc 27. As shown in FIG. 12, the clamping disc 27 includes a circular ring consisting of two semicircular clamping components of a same size. Annular grooves matched with the raised-edge shape of both the flange 22 and the filter cylinder frame 18 are provided on the two semicircular clamping components, and the two clamping components are connected by bolts. As shown in FIG. 8, the front frame 24 is a hollow frame, a residue outlet is provided on the bottom of the front frame 24, and one end of the front frame 24 is connected to the flange 22 while the other end is connected to the front gland 25. The sliding sleeve 26 is arranged inside a bearing within the front frame 24 and the front gland 25, the first shaft 11 is in key connection to the sliding sleeve 26, and several grooves are provided on an outer wall of the sliding sleeve 26. As shown in FIGS. 10 and 17, an outer wall of one end of the control valve 7 is in threaded connection to an inner wall of the flange 22, while gear teeth are provided on an outer wall of the other end of the control valve 7. The control valve 7 is engaged with a gear shaft 28 through the gear teeth. A ratchet wrench 29 is provided on the gear shaft 28. The gear shaft 28 is mounted on the front frame 24 and is rotatable on the front frame 24. The rotation of the ratchet wrench 29 can drive the rotation of the gear shaft 28 so that the control valve 7 can rotate relative to the flange 22 to generate a displacement. As shown in FIG. 9, the control valve braking block 23 is mounted on the front frame 24 through a pin shaft, and the control valve braking block 23 can be jammed on the gear teeth of the control valve 7 exposed out from the front frame 24.

The bone dregs are discharged from the residue discharge gap and then discharged from the residue outlet on the front frame 24. The sliding sleeve 26 is used to support the first shaft 11, and several grooves are formed on the outer wall of the sliding sleeve 26, so that it is convenient to rotate the sliding sleeve 26 when mounted so as to accurately mount the sliding sleeve 26 and the first shaft 11.

During the separation of the meat cubes from the bone dregs, the gear shaft 28 can be driven to rotate by rotating the ratchet wrench 29, and the gear shaft 28 then drives the control valve 7 engaged with the gear shaft to rotate, so that the control valve 7 can rotate relative to the flange 22 to generate a displacement. Accordingly, the gap between the control valve 7 and the conical sleeve 13 may be adjusted, and the yield is further adjusted.

Figure 18:
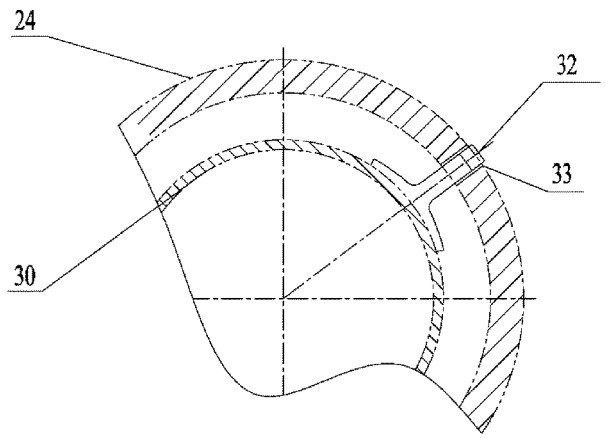
FIG. 18 is a schematic structure diagram of the connection of the front frame and a shield of the bone-meat separator of FIG. 1.

The bone-meat separation portion 6 further includes a shield 30 with an opening formed on the bottom thereof. The shield 30 is mounted on the control valve 7 through a compression ring 31 (FIG. 10). As shown in FIG. 18, a pointer 32 is fixedly mounted on the shield 30, a pointer opening 33 having a width matched with the width of the pointer 32 is formed on the front frame 24 in the axial direction, and the pointer 32 extends into and out from the pointer opening 33. A scale is provided on a side wall of the periphery of the front frame 24 where the pointer opening 33 is formed.

Since the bone-meat separator has a high rotation speed and a high pressure during its operation and the discharged bone dregs splash out, a shield 30 is connected to the control valve 7, so that the discharged bone dregs are blocked during the separation, and both cleanness and safety are ensured. The pointer 32 on the shield 30 may indicate a graduation through the scale on the front frame 24 to indicate the yield. The gap between the control valve 7 and the conical sleeve 13 may be represented by the position indicated by the pointer 32. Different scale positions indicate different gaps between the control valve 7 and the conical sleeve 13. On the other hand, since the pointer 32 is fixedly mounted on the shield 30 and extends into the pointer opening 33 on the front frame 24, the pointer 32 on the shield 30 can restrict the rotation of the shield 30. Therefore, during the adjustment of the control valve 7, the shield 30 will not rotate along with the rotation of the control valve 7. Moreover, since the opening of the shield 30 is always orientated downward, it is ensured that the bone dregs are intensively discharged from the opening below the shield 30 and then discharged from the residue outlet on the bottom of the front frame 24.

Figure 19:
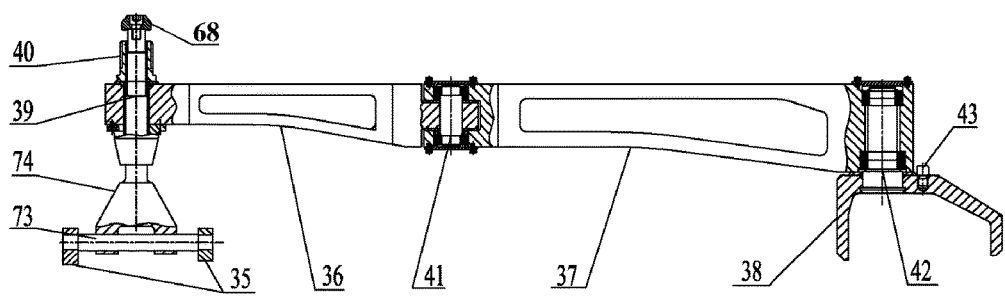
FIG. 19 is a schematic structure diagram of a swing-type lifter frame of the bone-meat separator of FIG. 1.

The bone-meat separator further includes a swing-type lifter frame 34. As shown in FIG. 19, the swing-type lifter frame 34 includes a lifter mount 35, a front swing arm 36, a rear swing arm 37 and a lifter support 38. The lifter mount 35 is arranged on the outer wall of the top of the front frame 24. The lifter support 38 is arranged on the outer wall of the high-pressure chamber 17. A sliding shaft 73 passes through the lifter mount 35, a lifter shield 74 is connected to the sliding shaft 73, and a lower end of the lifter shield 74 is sheathed on the sliding shaft 73. One end of the front swing arm 36 is connected to the top of the lifter shield 74 through a lifter adjusting bolt 39. A lifter adjusting nut 40 is provided outside the lifter adjusting bolt 39 above the front swing arm 36, and a lifter protection cover 68 is provided on the top of the lifter adjusting bolt 39. The lifter adjusting bolt 39 can move up and down by rotating the lifter adjusting nut 40. The other end of the front swing arm 36 is connected to one end of the rear swing arm 37 through a middle spindle 41, while the other end of the rear swing arm 37 is connected to the lifter support 38 through a rear spindle 42.

The swing-type lifter frame 34 is used in the maintenance and cleaning process of the bone-meat separator and the front and rear swing arms are rotated freely. After the front and rear swing arms are rotated to proper positions as desired, the disassembly, cleaning and mounting operations of the bone-meat separation portion 6 can be easily completed. The lifter adjusting nut 40 may move up and down by adjusting the lifter adjusting bolt 39 through threads, so that the height of both the front swing arm 36 and the rear swing arm 37 is adjusted. Thus, it is convenient to mount and use, and almost no secondary adjustment is required after the primary adjustment. The lifter protection cover 68 may prevent the uncontrolled bounce of the swing-type lifter frame 34 resulted from the thread failure, thereby ensuring the safety. A lifter limiting pin 43 is provided on the lifter support 38, so that the angle of rotation of the swing arms may be limited and the obstruction resulted from a too large angle of rotation is avoided when in use.

Figure 11:
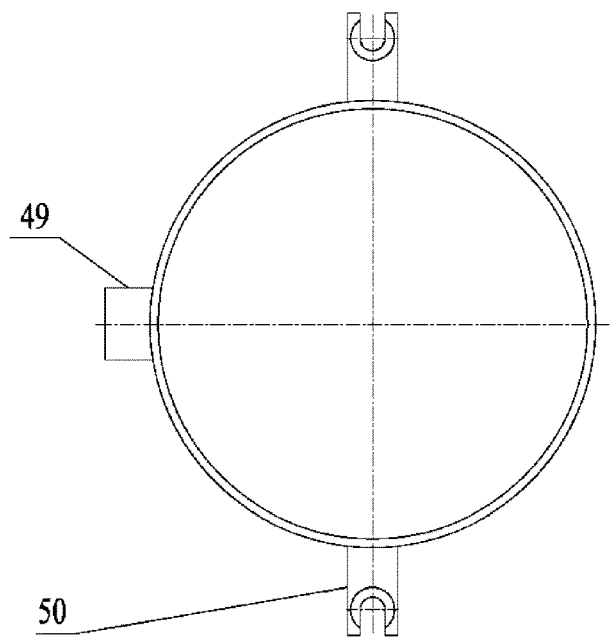
FIG. 11 is a schematic structure diagram of a first isolation hood or a second isolation hood of the bone-meat separator of FIG. 1.
Figure 13:
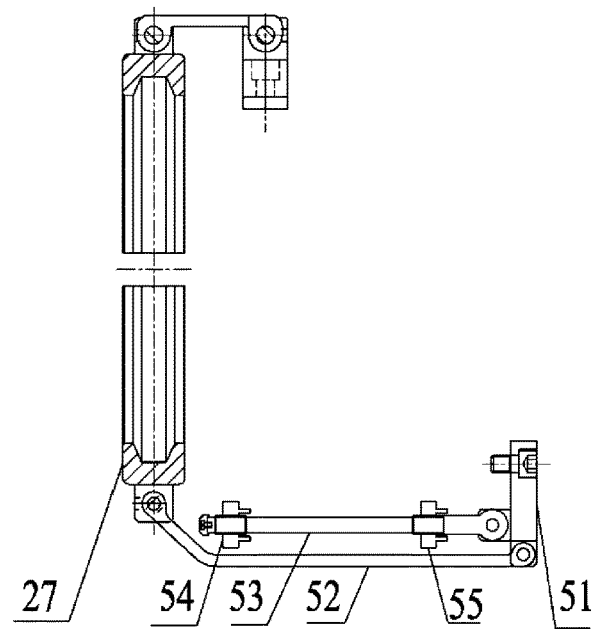
FIG. 13 is a schematic structure diagram of the connection of the clamping disc and a fastening component of the bone-meat separator of FIG. 1.

As shown in FIG. 10, a partition ring 44 is provided inside the filter cylinder frame 18. An inner wall of the partition ring 44 contacts the outer wall of the separation cylinder 19 to partition the filter cylinder frame 18 into a first frame 45 and a second frame 46. Meat outlets are provided on both the first frame 45 and the second frame 46. A first isolation hood 47 is sheathed outside the first frame 45, and a second isolation hood 48 is sheathed outside the second frame 46. A pipe port 49 is provided on the first insulation hood 47 and/or the second isolation hood 48. As shown in FIG. 11, fixed plates 50 each having an opening formed on its bottom are provided on the first insulation hood 47 and/or the second isolation hood 48, and the first insulation hood 47 and/or the second isolation hood 48 is fastened on the filter cylinder frame 18 through a fastening component. As shown in FIG. 13, the fastening component includes a fastening mount 51, a fastening connecting plate 52 and a fastening locking screw 53. The fastening mount 51 is arranged on the high-pressure chamber 17. Two ends of the fastening connecting plate 52 are connected to the fastening mount 51 and the clamping disc 27 through pin shafts, respectively. One end of the fastening locking screw 53 is connected to the fastening mount 51 through a pin shaft. A first fastening locknut 54 and/or a second fastening locknut 55 is provided on the fastening locking screw 53. The fastening locking screw 53 passes through the fixed plates 50 and is then locked by the first fastening locknut 54 and/or the second fastening locknut 55.

The meat cubes separated by the separation cylinder 19 are different in fiber property. The meat cubes separated by a portion of the separation cylinder 19 close to the high-pressure chamber 17 has better fiber property and better taste, so the meat cubes may be used as raw materials of high-grade products. However, the meat cubes separated by a portion of the separation cylinder away from the high-pressure chamber 17 has lower fiber property and may be used as raw material of ordinary products. Since the partition ring 44 inside the filter cylinder frame 18 partitions the body of the filter cylinder frame 18 into a first frame 45 and a second frame 46, the meat cubes separated by the front and rear portions of the separation cylinder 19 are isolated from each other, so that the meat paste separated by the two portions may be collected according to the requirements of a user and then processed into different products. Meanwhile, optionally, a first isolation hood 47 and a second isolation hood 48 are provided outside the first frame 45 and the second frame 46, respectively, and pipe ports 49 for connecting hoses are formed on the first frame and the second frame, so that material discharge is centralized and it is cleaner. According to the actual requirements of a user, in the present invention, both of the first isolation hood 47 and the second isolation hood 48 or neither the first isolation hood 47 nor the second isolation may be provided, or only one of the first isolation hood 47 and the second isolation hood 48 is provided in different embodiments of this invention.

In the present invention, two fixed plates 50 are provided on the first isolation hood 47 and the second isolation hood 48, respectively, for fixing and positioning the first isolation hood 47 and the second isolation hood 48 when the fastening components work. When the first isolation hood 47 and the second isolation hood 48 are fastened by fastening components, the first isolation hood 47 and the second isolation hood 48 are sheathed from the smaller end of the filter cylinder frame 18; then, the fastening locking screw 53 is swung into the openings on the fixed plates 50 on two sides of the first isolation hood 47 and/or the second isolation hood 48; and, the first fastening locknut 54 and/or the second fastening locknut 55 are rotated, and during the rotation of the nut, a force is applied to allow the first isolation hood 47 and the second isolation hood 48 to move toward the larger end of the filter cylinder frame 18 to realize the purpose of fastening.

Figure 20:
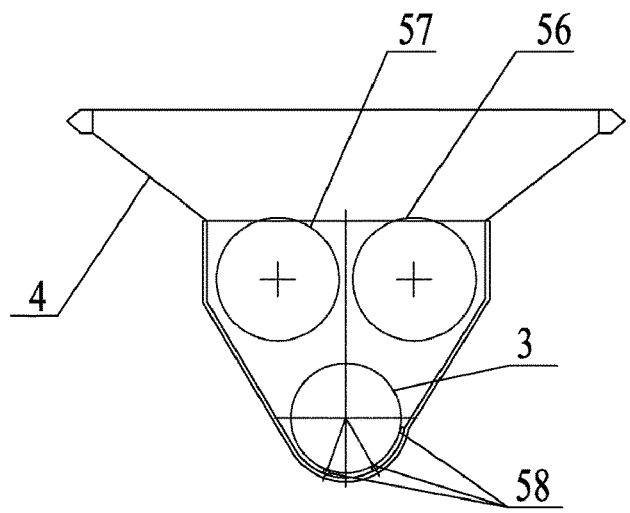
FIG. 20 is a schematic diagram of an internal structure of a feed hopper of the bone-meat separator of FIG. 1.

As shown in FIG. 20, the feed hopper 4 is located above the spiral shaft 3 and provided with a first spiral crushing shaft 56 and a second spiral crushing shaft 57 which rotate together in opposite directions, and several guide strips 58 are provided between the bottom of the feed hopper 4 and the spiral shaft 3.

Figure 21:
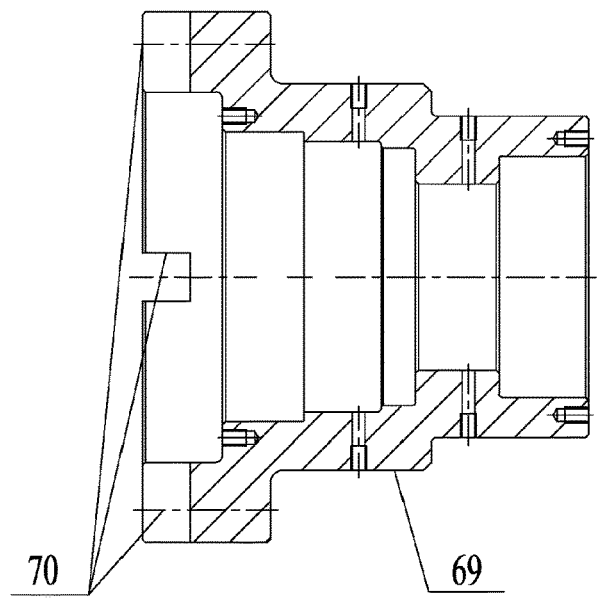
FIG. 21 is a schematic structure diagram of a bearing seat of the bone-meat separator of FIG. 1.

As shown in FIG. 1, the driving mechanism includes a motor 59, a belt 60, a first pulley 61, a second pulley 62 and a speed reducer 63. An output shaft of the motor is connected to the first pulley 61. The first pulley 61 is connected to the second pulley 62 through the belt 60, and the second pulley 62 is connected to an input shaft of the speed reducer 63. An output shaft of the speed reducer 63 is connected to the transmission shaft 2 through a coupler 64. A first chain wheel 65 is provided on the coupler 64. A second chain wheel 66 and a first gear 67 are provided on the first spiral crushing shaft 56. The first chain wheel 65 is connected to the second chain wheel 66 through a chain. A second gear is provided on the second spiral crushing shaft 57. The first gear 67 is engaged with the second gear. As shown in FIG. 21, the transmission shaft 2 is arranged on a bearing seat 69, and a sewage outlet 70 capable of discharging the material leaked onto the bearing seat 69 is provided on an end face of an end of the bearing seat 69 close to the feed hopper 4.

By additionally providing a first spiral crushing shaft 56 and a second spiral crushing shaft 57 above the spiral shaft 3, the material will be preliminarily crushed before contacting the spiral shaft 3; and, the material may be further crushed by the guide strips 58 between spiral shaft 3 and the bottom of the feed hopper 4, so that the degree of crushing is improved. By providing a first chain wheel 65 on the coupler 64 and connecting the first chain wheel to a second chain wheel 66 on the first spiral crushing shaft 56, the power is transferred, and the engagement of the first gear 67 with the second gear allows the two crushing shafts to rotate in opposite directions.

The motor 59 is a variable-frequency motor. By controlling the rotation speed of the motor 59 through a converter, the rotation speed of the motor 59 may be flexibly adjusted according to the hardness of the raw material. Moreover, the separation speed may be adjusted by controlling the rotation speed of the motor 59, so that the yield is directly controlled. For different raw materials, the bone-meat separator may operate at a high speed or a low speed. For example, when the raw material to be separated is at a low temperature, the raw material is relatively hard, and the device power is relatively highly required, so that a lower rotation speed may provide a higher torque to separate the material and the device is also protected. A too high separation speed will aggravate the damage to the components of the device, and both the service life of the device and the quality of the eventually separated meat are thus influenced. A higher speed is used to separate relatively soft raw material. The soft raw material has better flowbability than the hard raw material, so that faster rotation is more beneficial for the device to convey the material.

The principles and implementations of the present invention have been described by specific examples in the present invention. The description of the embodiments is merely for helping the understanding of the methods of the present invention and their concepts. Meanwhile, it should be understood by a person of ordinary skill in the art that various changes may be made to the specific implementations and usage ranges without departing from the concepts of the present invention. In conclusion, the content of the description shall not be regarded as any limitations to the present invention.

What is claimed is:

1. A bone-meat separator, comprising:
a chassis,
a driving mechanism,
a transmission shaft,
a spiral shaft,
a feed hopper,
a pressurization portion, and
a bone-meat separation portion,
wherein the feed hopper is arranged on the chassis;
an outlet of the feed hopper is communicated with an inlet of the pressurization portion, and an outlet of the pressurization portion is communicated with an inlet of the bone-meat separation portion;
a first end of the transmission shaft is connected to an output end of the driving mechanism, and one end of the spiral shaft is sheathed on a second end of the transmission shaft and is movable relative to the transmission shaft;
the spiral shaft comprises a feeding spiral shaft portion located below the feed hopper, a pressurization spiral shaft portion located within the pressurization portion, and a separation spiral shaft portion located within the bone-meat separation portion;
the separation spiral shaft portion is a conical spiral shaft;
the bone-meat separation portion is a conical component coaxially sheathed on a periphery of the separation spiral shaft portion, and an inner wall of the bone-meat separation portion is in clearance fit with an outer wall of the separation spiral shaft portion;
larger ends of both the separation spiral shaft portion and the bone-meat separation portion are ends close to the pressurization portion;
meat discharge gaps are provided on a side wall of the end of the bone-meat separation portion close to the pressurization portion;
a control valve is provided inside the bone-meat separation portion and sheathed on a periphery of a front end of the separation spiral shaft portion, and a residue discharge gap is provided between the control valve and the front end of the separation spiral shaft portion;
a residue outlet is provided on a side wall of the bone-meat separation portion in front of the control valve;
the spiral shaft is a hollow spiral shaft within which an adjustment lever is provided;
a connector is internally fixed at one end of the spiral shaft connected to the transmission shaft; and, a first end of the adjustment lever is in threaded connection to the connector, while a second end of the adjustment lever extends out from the spiral shaft and then into the bone-meat separation portion.

2. The bone-meat separator according to claim 1, wherein an adjustment lever locknut is provided at one end of the adjustment lever extending out from the spiral shaft, an annular groove is provided on an outer wall of the adjustment lever locknut, and a nylon sleeve annularly sheathed on a periphery of the adjustment lever is sheathed in a middle portion of the spiral shaft.

3. The bone-meat separator according to claim 1, wherein the separation spiral shaft portion comprises a first shaft, a second shaft, a conical sleeve and a separation spiral; the second shaft is connected to the pressurization spiral shaft portion, the separation spiral is arranged on a periphery of the second shaft, and the second shaft is in key connection to the separation spiral; all the first shaft, the second shaft, the pressurization spiral shaft portion and the feeding spiral shaft portion are formed integrally; the separation spiral is conical, and the larger end of the separation spiral is an end close to the pressurization spiral shaft portion; and elongated bumps each having a semicircular cross-section are axially provided on an outer surface of a spiral groove of the separation spiral between blades;

the conical sleeve is arranged on a side close to a smaller end of the separation spiral, located on the periphery of the second shaft and in key connection to the second shaft, and the conical sleeve is locked by conical sleeve locknuts;

the control valve is arranged on a periphery of the conical sleeve, and an inner conical surface fitted with the conical sleeve is provided on an inner wall of the control valve, the residue discharge gap is provided between the outer wall of the conical sleeve and the inner conical surface of the control valve, several residue guide grooves are uniformly distributed on a side wall of the conical sleeve in a circumferential direction of the conical sleeve, and a lengthwise direction of each of the residue guide grooves is in an axial direction of the conical sleeve; and the first shaft is a conical shaft, and the larger end of the first shaft is an end connected to the second shaft.

4. The bone-meat separator according to claim 3, wherein the pressurization portion comprises a high pressure chamber, a spiral rifling is provided on an inner wall of the high pressure chamber, and the high pressure chamber is arranged on the chassis and communicated with the outlet of the feed hopper; and the bone-meat separation portion comprises a filter cylinder frame and a separation cylinder; the separation cylinder is a conical cylinder coaxial with the spiral shaft, and a larger end of the separation cylinder is an end close to the high pressure chamber; the filter cylinder frame is a conical cylinder coaxial with the spiral shaft, meat outlets are provided on the filter cylinder frame, and the larger end of the filter cylinder frame is connected to an end face of the outlet of the high pressure chamber; the separation cylinder is nested in the filter cylinder frame; the separation cylinder is sheathed on the periphery of the separation spiral shaft portion and in clearance fit with the separation spiral shaft portion; a plurality of meat discharge gaps are provided on the separation cylinder, and the meat discharge gaps are arranged in a lengthwise direction along an axial direction of the separation cylinder and extend from the larger end to a smaller end of the separation cylinder; and, annular reinforcing ribs are provided on the outer wall of the separation cylinder.

5. The bone-meat separator according to claim 4, wherein a depth direction of the meat discharge gaps is inclined and offset from a radial direction of the separation cylinder, and a direction of inclination is the same as a rotation direction of the spiral shaft; and, a width of the meat discharge gaps gradually becomes larger from the inner wall to the outer wall of the separation cylinder.

6. The bone-meat separator according to claim 4, wherein the bone-meat separation portion further comprises a flange, a control valve braking block, a front frame, a front gland and a sliding sleeve; the flange is clamped with the filter cylinder frame through a clamping disc; the front frame is a hollow frame, a residue outlet is provided on the bottom of the front frame, and a first end of the front frame is connected to the flange while a second end is connected to the front gland; and the sliding sleeve is arranged inside a bearing within the front frame and the front gland, the first shaft is in key connection to the sliding sleeve, and a number of grooves are provided on an outer wall of the sliding sleeve; and an outer wall of a first end of the control valve is in threaded connection to an inner wall of the flange, while gear teeth are provided on an outer wall of a second end of the control valve; the control valve is engaged with a gear shaft through the gear teeth; a ratchet wrench is provided on the gear shaft; the gear shaft is mounted on the front frame and is rotatable on the front frame; rotation of the ratchet wrench can drive the rotation of the gear shaft so that the control valve is allowed to rotate relative to the flange to generate a displacement; and, the control valve braking block is mounted on the front frame through a pin shaft, and the control valve braking block can be jammed on the gear teeth of the control valve exposed out from the front frame.

7. The bone-meat separator according to claim 6, wherein the bone-meat separation portion further comprises a shield with an opening formed on the bottom thereof; the shield is mounted on the control valve through a compression ring; a pointer is fixedly mounted on the shield, a pointer opening having a width matched with the width of the pointer is formed on the front frame in an axial direction, and the pointer extends into and out from the pointer opening; and, a scale is provided on a side wall of a periphery of the front frame where the pointer opening is formed.

8. The bone-meat separator according to claim 6, wherein the bone-meat separator further comprises an swing-type lifter frame; the swing-type lifter frame comprises a lifter mount, a front swing arm, a rear swing arm and a lifter support; the lifter mount is arranged on the outer wall of the top of the front frame; the lifter support is arranged on the outer wall of the high pressure chamber; a sliding shaft passes through the lifter mount, a lifter shield is connected to the sliding shaft, and a lower end of the lifter shield is sheathed on the sliding shaft; a first end of the front swing arm is connected to the lifter shield through a lifter adjusting bolt; a lifter adjusting nut is provided outside the lifter adjusting bolt above the front swing arm, and a lifter protection cover is provided on the top of the lifter adjusting bolt; the lifter adjusting bolt can move up and down by rotating the lifter adjusting nut; a second end of the front swing arm is connected to a first end of the rear swing arm through a middle spindle, while a second end of the rear swing arm is connected to the lifter support through a rear spindle; and, a lifter limiting pin is provided on the lifter support.

9. The bone-meat separator according to claim 6, wherein a partition ring is provided inside the filter cylinder frame; an inner wall of the partition ring comes into contact with the outer wall of the separation cylinder to partition the filter cylinder frame into a first frame and a second frame; meat outlets are provided on both the first frame and the second frame; a first isolation hood is sheathed outside the first frame, and/or a second isolation hood is sheathed outside the second frame; a pipe port is provided on the first isolation hood and/or the second isolation hood; fixed plates each having an opening formed on its bottom are provided on the first isolation hood and/or the second isolation hood, and the first isolation hood and/or the second isolation hood is fastened on the filter cylinder frame through a fastening component; the fastening component comprises a fastening mount, a fastening connecting plate and a fastening locking screw; the fastening mount is arranged on the high pressure chamber; two ends of the fastening connecting plate are connected to the fastening mount and the clamping disc through pin shafts, respectively; one end of the fastening locking screw is connected to the fastening mount through a pin shaft; a first fastening locknut and/or a second fastening locknut is provided on the fastening locking screw; and, the locking screw passes through the fixed plates and is then locked by the first fastening locknut and/or the second fastening locknut.

10. The bone-meat separator according to claim 1, wherein the feed hopper is located above the spiral shaft and provided with a first spiral crushing shaft and a second spiral crushing shaft which rotate together in opposite directions, and a plurality of guide strips are provided between the bottom of the feed hopper and the spiral shaft; and the driving mechanism comprises a motor, a belt, a first pulley, a second pulley and a speed reducer; an output shaft of the motor is connected to the first pulley; the first pulley is connected to the second pulley through the belt, and the second pulley is connected to an input shaft of the speed reducer; an output shaft of the speed reducer is connected to the transmission shaft through a coupler; a first chain wheel is provided on the coupler; a second chain wheel and a first gear are provided on the first spiral crushing shaft; the first chain wheel is connected to the second chain wheel through a chain; a second gear is provided on the second spiral crushing shaft; the first gear is engaged with the second gear; the transmission shaft is arranged on a bearing seat; and, a sewage outlet is provided on an end face of an end of the bearing seat close to the feed hopper.

* * * * *